UNITED STATES PATENT OFFICE 2,127,298

COMPOSITION OF MATTER

Mone R. Isaacs, Philadelphia, Pa.

No Drawing. Application August 17, 1936, Serial No. 96,536

9 Claims. (Cl. 134—50)

The invention relates to a composition containing as its characteristic ingredients resinous matter and one or more substances of the class consisting of proteins, starches and derivatives thereof which is capable of forming a colloidal suspension in water or other liquid. The composition is adapted to be mixed with water or other liquids and when so mixed may be used for various purposes in various fields according to the proportion of liquid employed, etc. Among the many applications of the composition may be mentioned the preparation of adhesives, binding or bonding materials, coating compositions, impregnating agents, molding compositions etc. The composition in all cases is characterized by being highly water resistant, possessing great elasticity and strong adhesive qualities, and having a long life.

The resinous matter may consist of various gums, resins, or oleo-resins or mixtures thereof. As examples of the substances which I may employ may be mentioned the varnish gums or resins such as accroides, copal, dammar, kauri, manila, gum mastic; resins such as common rosin; ester gums; synthetic resins or gums such as cumaron resin; the oleo-resins such as Canada balsam, Peru balsam and the somewhat similar substances obtained from Oregon fir trees.

The proteins, starches or their derivatives may advantageously be casein, soya bean meal, glue, peanut meal, cassava flour, linseed meal, dextrin or mixtures thereof.

As additional ingredients the composition may contain a solvent or thinning agent for the resinous substances. Among the various solvents or thinning agents which I may use may be mentioned alcohols, gasoline, naphtha, sulphonated oils or similar materials. When casein is used there may also be included a substance for rendering the casein soluble. Such substances may include lime either quick or slaked, borax, soda ash, sodium silicate, sodium tungstate, sodium triphosphate, sodium aluminate, ammonium phosphate or other alkalies, with or without the addition of water soluble fluoride, preferably a sodium fluoride, for retarding the quick setting action of the composition when lime is used.

In certain cases it is advantageous to add to the composition a softening agent which will tend to render more pliable any coating or the like formed from the compound resulting from the mixture of the composition with water or other liquid. For a softening agent may be used for example, gasoline, mineral, vegetable or sulphonated oil, waxes, gums, glycerine, fats or soaps, the latter being preferably neutral, and in granular form.

In certain cases it is advantageous to add an aqueous dispersion of rubber, or asphaltum, or a mixture thereof. Particularly when rubber or asphaltum forms part of the mixture, it will be advantageous to add to the mixture previous to use, or even after its application to a surface, a small quantity of fixing agent tending to facilitate the precipitation of the mixture. Among suitable agents for this purpose are, for example, aldehydes such as formaldehyde; aluminum salts such as sodium aluminate, aluminum sulphate, aluminum acetate, aluminum sodium silicate, aluminum stearate, aluminum oleate, or aluminum palmitate; zinc compounds such as zinc oxide, etc.

The organic aluminum salts or soaps such as aluminum stearate, oleate or palmitate are particularly desirable as they appear to render the final product very flexible and to increase its toughness and resistance to water. Aluminum sodium silicate also appears to produce these desirable results.

In some instances I may advantageously add vulcanizing agents with or without accelerators for the rubber of the composition. Among such materials I may mention sulphur, sodium polysulphide, ammonium polysulphide, etc. Fillers and pigments may also be added. Among such materials I may mention clay, grit, asbestos, mineral wool, hair, cellulose fiber, wood flour, etc.

When a balsam is used as the resinous material, I prefer to use isopropyl alcohol as the solvent as it appears to enrich the mixture and serves to insure its stability and preservation especially of the latex as well as the colloids in the mixture.

It will of course be understood that the proportions, ingredients and the manner and order of adding the ingredients may be varied within fairly wide limits depending upon a number of factors including the use to which the composition is to be put. It may, however, be indicated by way of example of an illustrative composition that for every 100 pounds of a dry protein, starch, their derivatives or mixtures thereof the composition may contain:—

Canada balsam or other gum, resin or oleo-resin _____ quarts__ ½ to 2
A solvent such as isopropyl alcohol _____ do____ ½ to 4
Lime or other alkali solvent for the protein, starch or derivative _____ pounds 12½ to 20
Sodium fluoride _____ do____ 2½ to 6
An aluminum soap such as aluminum stearate _____ 10 ounces to 2 pounds
Latex (40%) _____ pounds__ 100 to 1000
Water _____ do____ 100 to 800

Instead of the latex, there may be used 50 to 400 pounds of dispersed asphalt (50%). A mixture of rubber and asphalt in suitable proportions may be employed.

I prefer not to add the water until the composition is to be used, for the dry material can be more readily stored and shipped.

As another example of composition, the composition may contain the following:—

| | | |
|---|---|---|
| Casein | pounds | 100 |
| Clay | do | 150 |
| Abrasive grains | do | 1250 |
| Lime | do | 15 to 20 |
| Canada balsam | quarts | ½ to 2 |
| Isopropyl alcohol | do | 1 to 3 |
| China wood oil | do | 1 to 2 |
| Sodium silicate (soluble) | pounds | 12½ |
| Latex (40%) | do | 100 to 500 |
| Aluminum stearate | ounces | 12 to 18 |

The uses of the composition herein disclosed are extensive and apply to many arts and industries. It may be used for the preparation of adhesives, binding or bonding materials, coating or paint compositions, impregnating agents, molding compositions, etc. The composition may be used in the making of such articles as coated wire, floor coverings, gaskets, brake lining, belting, laminated paper, laminated structures consisting of two or more layers, one or more of which may be paper, fabric, metal, wood, rubber, asphaltum, glass, stone, vegetable and/or mineral fibres, etc. The composition is especially adapted for the making and applying of insulation to buildings, telephone booths and vehicles, such as automobiles and railway cars. The composition may also be used for the making of abrasives and abrasive wheels.

The material may be used to form abrasive wheels. For instance 150 lbs. of the dry powder prepared as above may be added to about 150 lbs. of clay. With this may be mixed about 1250 lbs. of suitable abrasive grain, and in order to make it plastic for working and forming there may be added from 250 to 350 lbs. of water depending upon the requirements. The addition of dispersed rubber from 100 lbs. up, or dispersed asphaltum 50 lbs. or more, or a suitable mixture of the two may be employed to impart additional toughness and flexibility to the composition. The abrasive wheels may be molded in the usual manner and may be fixed to suitable shafts in the usual manner or the abrasive need not be formed into a wheel but may be used in any desirable form.

The material may be used for paints. For this purpose various compositions, mixtures and proportions may be employed. For instance for using 100 lbs. of dry minerals or pigments there may be employed about 35 lbs. of clay, asbestine or other mineral matters, to which may be added about 25 lbs. of whiting, about 20 lbs. of lime and about 20 lbs. of lithopone all of which may be mixed with from 12 to 20 lbs. of the dry adhesive resin-protein-starch described above. This dry paint mixture may be added to about 150 lbs. of water, when it may be ready for use, or it may be used in connection with 50 to 100 lbs. of rubber latex added or the same quantity or a like quantity of asphaltum or a mixture of them. It will be understood of course, that these proportions are subject to change depending upon the requirements in each case.

The foregoing specification and description include the essential and distinctive thought of my invention, but it is to be distinctly understood that the same may be modified in various ways and/or combined with various other details without affecting the peculiar results obtained, and without departing from the spirit of the invention or the scope of the appended claims, in which I intend to claim all the patentable novelty inherent in my invention.

I claim:

1. A composition of matter containing a water soluble colloidal substance selected from a group consisting of proteins, starches and their derivatives, a resin, a solvent for the resin, an alkali, aluminum stearate, and dispersed rubber.

2. A composition of matter containing a water soluble colloidal substance selected from a group consisting of proteins, starches and their derivatives, a resin, a solvent for the resin, an alkali, and aluminum stearate.

3. A composition of matter containing soya bean meal, lime, sodium fluoride, aluminum stearate, an oleo-resin, isopropyl alcohol, and dispersed rubber.

4. A composition of matter containing soya bean meal, lime, sodium fluoride, aluminum stearate, an oleo-resin, isopropyl alcohol, and dispersed asphalt.

5. A composition of matter containing a water soluble colloidal substance selected from a group consisting of proteins, starches and their derivatives, a resin, a solvent for the resin, aluminum stearate, and a dispersion of a substance selected from a group consisting of latex and asphalt.

6. A composition of matter containing a water soluble colloidal substance selected from a group consisting of proteins, starches and their derivatives, a resin, a solvent for the resin, an alkali, an organic salt of aluminum, and dispersed rubber.

7. An abrasive comprising a water soluble, colloidal substance selected from a group consisting of proteins, starches and their derivatives, resinous matter, a solvent for the resinous matter, an alkali earth, aluminum stearate, and abrasive grain.

8. A paint comprising a water soluble colloidal substance selected from a group consisting of proteins, starches and their derivatives, resinous matter, a solvent for the resinous matter, an alkali earth, aluminum stearate, whiting, and lithopone.

9. A paint comprising a water soluble colloidal substance selected from a group consisting of proteins, starches and their derivatives, resinous matter, a solvent for the resinous matter, an alkali earth, aluminum stearate, lithopone, and dispersed rubber.

MONE R. ISAACS.